Sept. 2, 1924.
L. A. PRIESS
1,507,297
SMOKER'S APPLIANCE
Filed Dec. 27, 1920
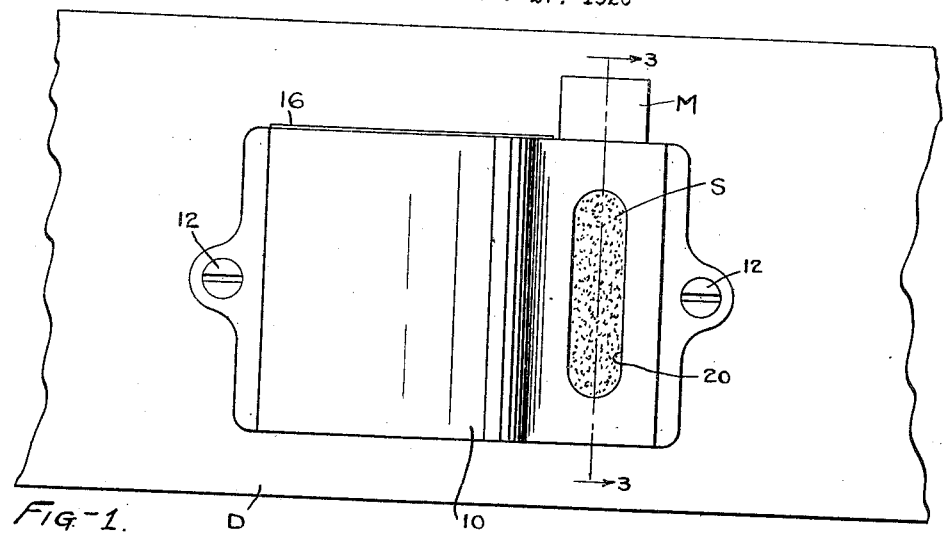
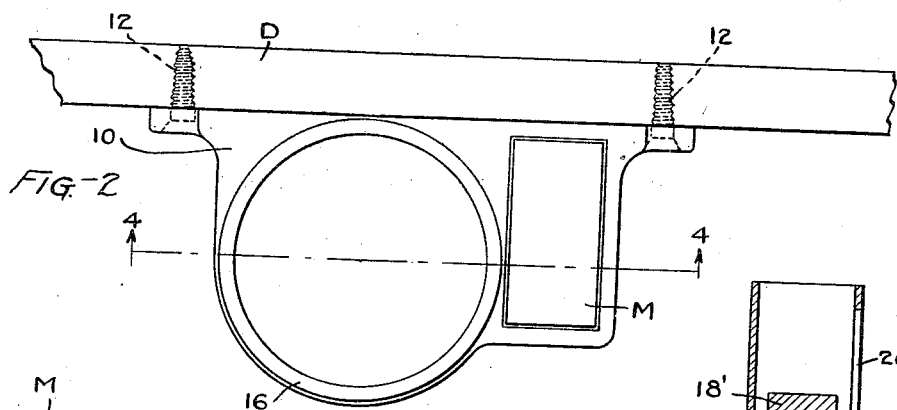
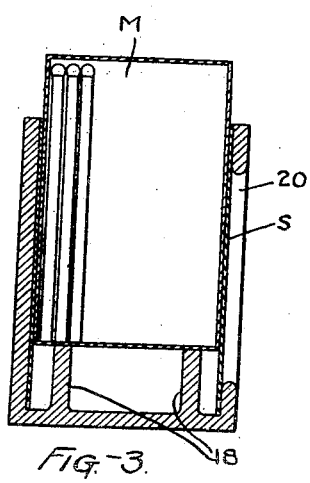
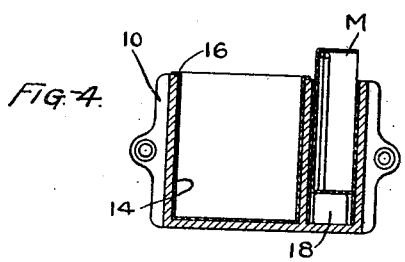
INVENTOR:
LOUIS A. PRIESS.
BY Whinley and Ruckman
ATTORNEYS Patented Sept. 2, 1924.

1,507,297

UNITED STATES PATENT OFFICE.

LOUIS A. PRIESS, OF MINNEAPOLIS, MINNESOTA, ASSIGNOR TO WILLIAM L. MINOR, OF MINNEAPOLIS, MINNESOTA.

SMOKER'S APPLIANCE.

Application filed December 27, 1920. Serial No. 433,197.

*To all whom it may concern:*

Be it known that I, LOUIS A. PRIESS, a citizen of the United States, residing at Minneapolis, in the county of Hennepin and State of Minnesota, have invented certain new and useful Improvements in Smokers' Appliances, of which the following is a specification.

My invention relates to smokers' appliances, and an object is to provide a device for smokers' use which is adapted to be attached to the dash of a motor vehicle, or a place which is within easy reach of the driver of the vehicle. My appliance includes a casing which may be constructed of sheet metal or composition, or which may be produced by casting or machining. This casing contains a compartment for holding a match box, and a compartment for receiving a removable cup adapted to hold either cigars, a pipe, or ashes as desired. A particular object, therefore, of my invention is to provide a device which will render the enjoyment of a smoke convenient for the driver of a motor vehicle, and which in the case of a closed car will provide a receptacle for receiving ashes in order to prevent littering up the interior of the car.

The full objects and advantages of my invention will appear in connection with the detailed description thereof, and the novel features embodied in my inventive idea will be particularly pointed out in the claim.

Referring to the accompanying drawings which illustrate one of the embodiments of my invention,—

Fig. 1 is an elevational view showing my device secured to the dash of an automobile. Fig. 2 is a top plan view. Fig. 3 is a view in section on the line 3—3 of Fig. 1. Fig. 4 is a view on a reduced scale and in section on the line 4—4 of Fig. 2. Fig. 5 is a sectional view of a slight modification of the matchbox compartment.

The drawings show a suitable casing 10 which is adapted to be secured to the dash D of a motor vehicle by screws 12. This casing is provided with a compartment or opening adapted to receive a cup 14 having an outwardly turned flange at its top to facilitate removal when it is desired to empty ashes which have been deposited therein. The casing 10 also contains a compartment or opening for holding a matchbox M, the bottom of this compartment or opening being provided with lugs 18, as shown in Fig. 3 or with a single lug 18', as shown in Fig. 5, for supporting the inner portion of the matchbox in raised position with relation to the outer portion of said matchbox in order that the matches may be readily accessible. The front wall of this latter compartment is provided with an opening 20 for exposing the match-striking surface S of the matchbox.

The operation and advantages of my invention will be obvious in connection with the foregoing description. The casing containing the compartment is placed so as to be within easy reach of the driver of a motor vehicle—preferably by securing it to the dash. When the driver wishes to enjoy a smoke he may light his cigar, cigarette or pipe upon removing a match from the matchbox and striking it upon the exposed surface of the box. This requires the use of only one hand so that the other hand may be kept upon the steering wheel, thereby avoiding danger of the driver losing control of the car. While the driver is smoking, he may from time to time deposit the ashes in the cup 14 which procedure is particularly desirable in the case of closed cars in which opportunity to knock the ashes outside is precluded. The cup is readily removable so that it may be emptied when desired. The cup may also, if desired, serve as a receptacle for cigars, cigarettes, or pipe. The casing is preferably given an ornamental appearance and may be highly polished so as not to detract from the appearance of the car.

I claim:

A smoker's appliance comprising an integral one-piece casing having a flat vertical wall adapted to be secured to a vertical support, said casing containing two vertically extending compartments open at their upper ends and arranged side by side, one of said compartments being adapted to receive a match box and being provided with an opening for exposing the striking surface of the match box, means in the bottom of said compartment for supporting the inner portion of the match box in raised position relatively to the outer portion thereof, and a cup removably supported in the other of said compartments.

In testimony whereof I hereunto affix my signature.

LOUIS A. PRIESS.